US006933076B2

United States Patent
Ura et al.

(10) Patent No.: US 6,933,076 B2
(45) Date of Patent: Aug. 23, 2005

(54) HEAT DISSIPATING BATTERY PACK

(75) Inventors: Hironori Ura, Hiratsuka (JP); Hiroki Takeshima, Fujisawa (JP); Ryoichi Hamasaki, Katano (JP); Osamu Aoya, Aichi (JP); Takehiro Chinen, Aichi (JP)

(73) Assignee: Matsushita Electric Industrial Co., Ltd., Osaka (JP)

( * ) Notice: Subject to any disclaimer, the term of this patent is extended or adjusted under 35 U.S.C. 154(b) by 564 days.

(21) Appl. No.: 10/018,394

(22) PCT Filed: Apr. 16, 2001

(86) PCT No.: PCT/JP01/03231

§ 371 (c)(1),
(2), (4) Date: Jan. 10, 2002

(87) PCT Pub. No.: WO01/80331

PCT Pub. Date: Oct. 25, 2001

(65) Prior Publication Data

US 2003/0017383 A1 Jan. 23, 2003

(30) Foreign Application Priority Data

Apr. 14, 2000 (JP) ........................................ 2000-113027

(51) Int. Cl.[7] .......................... H01M 2/00; H01M 2/02; H01M 6/08; H01M 6/42; H01M 10/50
(52) U.S. Cl. ........................ 429/164; 429/163; 429/149; 429/120
(58) Field of Search ................................ 429/120, 149, 429/163, 164, 99, 148, 168; 136/245; 180/68.5; 62/3.2

(56) References Cited

U.S. PATENT DOCUMENTS

| 6,087,038 A | * | 7/2000 | Flament et al. | 429/120 |
| 6,479,185 B1 | * | 11/2002 | Hilderbrand et al. | 429/148 |
| 6,537,694 B1 | * | 3/2003 | Sugiura et al. | 429/120 |
| 6,692,864 B1 | * | 2/2004 | Dansui et al. | 429/120 |
| 6,783,886 B1 | * | 8/2004 | Sakakibara et al. | 429/99 |

FOREIGN PATENT DOCUMENTS

| EP | 0869571 | 10/1998 |
| JP | 61-114767 | 7/1986 |
| JP | 6-223804 | 8/1994 |
| JP | 9-306447 | 11/1997 |
| JP | 10-106521 | 4/1998 |

* cited by examiner

Primary Examiner—Michael Barr
Assistant Examiner—Robert Hodge
(74) Attorney, Agent, or Firm—Jordan and Hamburg LLP

(57) ABSTRACT

A battery pack includes a plurality of cells (2) stacked on top of one another in tiers; a heat collecting plate (4, 7) made of a wave-like metal sheet and interposed between tiers of the cells so as to make contact with outer peripheral surfaces of upper and lower tiers of the cells alternately; a heat pipe (10) having its heating portion (10a) fitted into a fitting groove (8, 9) formed in the heat collecting plate; a pack case (1) for accommodating the cells, the heat collecting plate, and the heat pipe; and a heat dissipating member (3) attached to the pack case so as to close an opening of the pack case and having on its inner-surface side a concavely-formed receiving groove (11) into which a heat dissipating portion (10b) of the heat pipe is fitted.

14 Claims, 5 Drawing Sheets

HEAT DISSIPATING BATTERY PACK

TECHNICAL FIELD

The present invention relates to a battery pack composed of a combination of a plurality of cells connected in series or parallel with one another.

BACKGROUND ART

In recent years, as electric tools such as electric drills or electric grinders have grown more and more powerful, battery packs for use as driving power sources in such electric tools are required to withstand exposure to high voltage and intense discharge. As a consequence of this trend, a single battery pack has come to have a larger number of cells, for example, as many as 30 pieces of cells. As a cell constituting a battery pack for use in electric tools, a nickel-cadmium rechargeable battery is commonly used, and besides a nickel metal hydride battery is recently coming into wider use in keeping with the demand for environmental conservation. These batteries are built as maintenance-free, cylindrical-shaped rechargeable batteries of enclosed-type.

In a conventional battery pack, a multiplicity of cylindrical rechargeable batteries needs to be housed in a limited space of a pack case. Thus, they are stacked in a staggered arrangement to make efficient use of available space. The electrodes of the batteries are electrically connected in series or parallel with one another by a nickel terminal plate or the like.

As described above, an enclosed-type battery is commonly used for a battery pack. In an enclosed-type battery, however, during charging and discharging operations, heat of reaction due to gas absorption reaction occurs along with generation of Joule heat. This leads to a temperature rise in the battery. Furthermore, a battery pack usually employs a resin-made pack case exhibiting poor thermal conductivity so as to be electrically insulated from a cell. Therefore, when a multiplicity of cells housed in the pack case generate heat, the pack case of poor thermal conductivity prevents heat from dissipating to the outside. Further, in a case where the battery pack is used as a driving power source of an electric tool or the like, during discharging for driving a motor or other, a large current is generated. This also leads to a temperature rise in the cell. For these reasons, the temperature of the cell might rise up to 80° C. or above. In this case, an alkaline rechargeable battery suffers from degradation of charging and discharging characteristics and shortening of charging and discharging cycle life, because it is prevented from being fully charged under high temperature conditions.

Moreover, of the cells housed in the pack case in a staggeredly-stacked arrangement, particularly the ones in the middle exhibit poor thermal dissipation characteristics due to their adjacent cells, and thus suffer from a more significant temperature rise as compared with the other cells. The difference in temperature among the cells leads not only to deterioration of the cells but also to variation in battery performance, as well as variation in the extent of deterioration, among the cells.

To suppress a temperature rise in staggeredly-stacked cells housed in a battery pack, various proposals have been made to date. For example, in the battery pack disclosed in Japanese Patent Publication No. 9-306447, a wave-like partition plate made of synthetic resin containing metallic oxide is interposed between tiers of cells. Heat generated by each cell is collected by the wave-like partition plate and is then dissipated, through a case cover making contact with the end portion of the wave-like partition plate, to the outside. Moreover, in the battery pack disclosed in Japanese Patent Publication No. 6-223804, of a plurality of staggeredly-stacked cells, the ones in the middle each have a heat dissipating plate disposed forward of its electrode. The heat dissipating plate has a terminal plate portion formed integrally therewith. The terminal plate portion is connected only to the electrode of the centrally-located cell. In this way, the difference in temperature among the cells is minimized. However, in either of these battery pack structures, the effect of collecting heat generated by the cells and the effect of dissipating the heat out of the case are insufficient. In addition, heat generated by the staggeredly-stacked cells is not evenly collected. This makes it impossible to narrow the difference in temperature among the cells.

The present invention has been made in view of the above-described problems with conventional art, and accordingly its object is to provide a battery pack in which a rise in temperature of a cell due to heat generation is suppressed and the difference in temperature among the cells is minimized.

DISCLOSURE OF THE INVENTION

To achieve the above object, a battery pack according to a first aspect of the invention comprises a plurality of cells stacked on top of one another in tiers; a heat collecting plate made of a wave-like metal sheet, being interposed between tiers of the cells so as to make contact with part of an outer peripheral surface of each of upper and lower tiers of the cells alternately; a heat pipe having its heating portion fitted into a fitting groove formed in the heat collecting plate; a pack case for housing the cells, the heat collecting plate, and the heat pipe; and a heat dissipating member attached to the pack case so as to close an opening of the pack case, the heat dissipating member having on its inner-surface side a concavely-formed receiving groove into which a heat dissipating portion of the heat pipe is fitted.

In the battery pack having such a structure, heat generated by a multiplicity of cells housed in the pack case in a staggeredly-stacked arrangement is collected substantially evenly and efficiently by the heat collecting plate. The heat collected is rapidly directed, through the heat pipe engaged into the fitting groove of the heat collecting plate, to the heat dissipating member as latent heat, and is thereby dissipating out of the battery pack. Since heat generated by each of the cells is efficiently dissipated to the outside, the battery pack is able to be charged and discharged continuously. Moreover, since heat generated by the cells is collected evenly, there is little difference in temperature among the cells. Thus, the battery functions of the cells are made uniform, so that the battery pack as a whole is constantly maintained in a high-performance state.

A battery pack according to a second aspect of the invention comprises a plurality of cells stacked on top of one another in tiers; a heat collecting plate made of a wave-like metal sheet, being interposed between tiers of the cells so as to make contact with part of an outer peripheral surface of each of upper and lower tiers of the cells alternately; a heat pipe having a heating portion fitted into a fitting groove formed in the heat collecting plate; a resin-made pack case for accommodating the cells, the heat collecting plate, and the heat pipe; a resin-made lid plate for closing the opening of the pack case; and a heat dissipating member fitted into a fitting recess formed on an outer surface of the lid plate, the heat dissipating member having on its inner-surface side an engagement portion into which a heat dissipating portion of the heat pipe, which is inserted through the lid plate, is fitted.

Constructing a battery pack in that way not only achieves the same effects as the battery pack of the first aspect of the invention, but also eliminates the need to use additional members for providing electrical insulation between the cell and the lid plate. This helps reduce the number of constituent components and thereby achieve cost reduction.

BEST MODE FOR CARRYING OUT THE INVENTION

Figure 1:
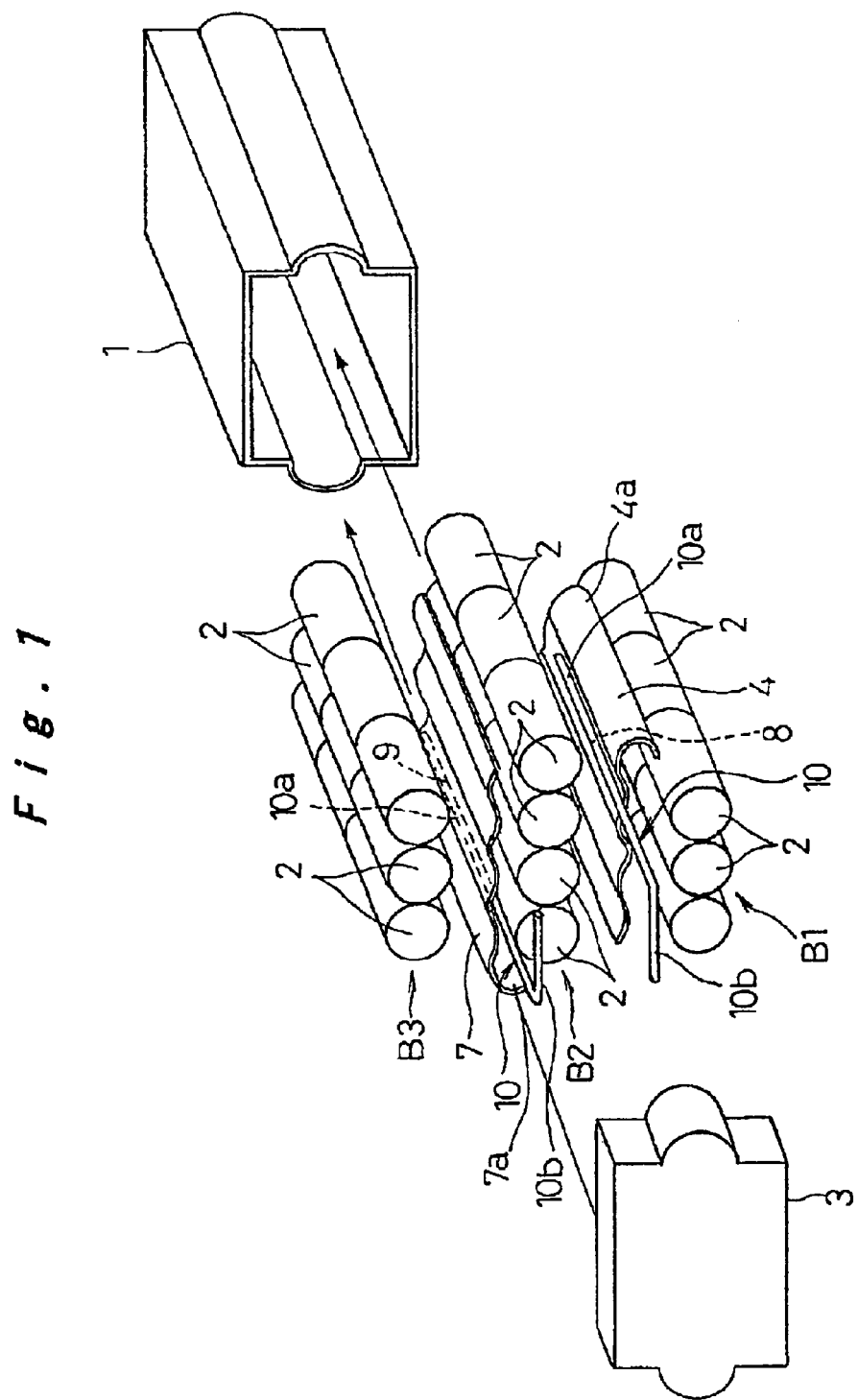
FIG. 1 is an exploded perspective view showing a battery pack according to a first embodiment of the present invention.

Preferred embodiments of the present invention will be hereinafter described with reference to the accompanying drawings. FIG. 1 is an exploded perspective view showing a battery pack according to a first embodiment of the present invention. In this battery pack, a resin-made pack case 1 of box shape with its one side opened houses 30 pieces of enclosed-type cylindrical cells 2 in a staggeredly-stacked arrangement. The opening of the pack case 1 is closed with a metal-made heat dissipating member 3 which also serves as a lid plate.

30 pieces of cells 2 are arranged in groups of three, and the three cells are connected in series with one another. Thereupon, 10 pieces of battery tiers are realized. 3 pieces of the battery tiers are closely arranged side by side on the same plane to form a lower battery module B1 composed of 9 cells 2; 4 pieces thereof are closely arranged side by side on the same plane to form a middle battery module B2; and 3 pieces of the battery tiers are closely arranged side by side on the same plane to form an upper battery module B3. These battery modules B1 to B3 are stacked on top of one another in such a way that their cells 2 are so arranged as to be offset with respect to one another by an amount of radius, that is; their cells 2 are staggered. Between the battery modules B1 to B3 are interposed heat collecting plates 4 and 7.

The heat collecting plate (4, 7) is of an approximately 0.3 mm-thick thin plate made of metal exhibiting excellent thermal conductivity, such as aluminum or copper. The heat collecting plate (4, 7) is formed in a shape of series of alternating arc-shaped turns, i.e. formed in a wave-like shape, so as to make contact with part of the outer surface of each cylindrical cell 2. The heat collecting plate (4, 7) has in one of its concavely-curved surface a fitting groove (8, 9) formed so as to extend along the axial center of the cell. Engaged into the fitting grooves 8, 9 are heat pipes 10, 10.

As is well known, the heat pipe 10 is a heat-transfer element made of a metal pipe having a wick structure in its inner wall. Inside the metal pipe is created a vacuum and is contained a small quantity of pure water as an working fluid. Upon application of heat to a heating portion at one end of the heat pipe, the operation fluid existing in the heating portion vaporizes, and by the resultant heat of vaporization, the heat is absorbed to form a vapor flow. After being moved toward a low-temperature heat dissipating portion at a high speed, the vapor flow reaches an inner wall of the heat dissipating portion, and is thereby cooled and condensed. Then, heat dissipation occurs due to release of the condensed latent heat, and eventually the condensed fluid returns to the heating portion by capillarity or gravity. By repeating this cycle, heat transfer/dissipation is successively achieved with extremely high efficiency. The heat pipe 10 is attached to the heat collecting plate (4, 7). The heat pipe 10 has its heating portion 10a fitted into the fitting groove (8, 9) and has its heat dissipating portion 10b bent perpendicularly to the heating portion 10a so as to extend horizontally.

Figure 2:
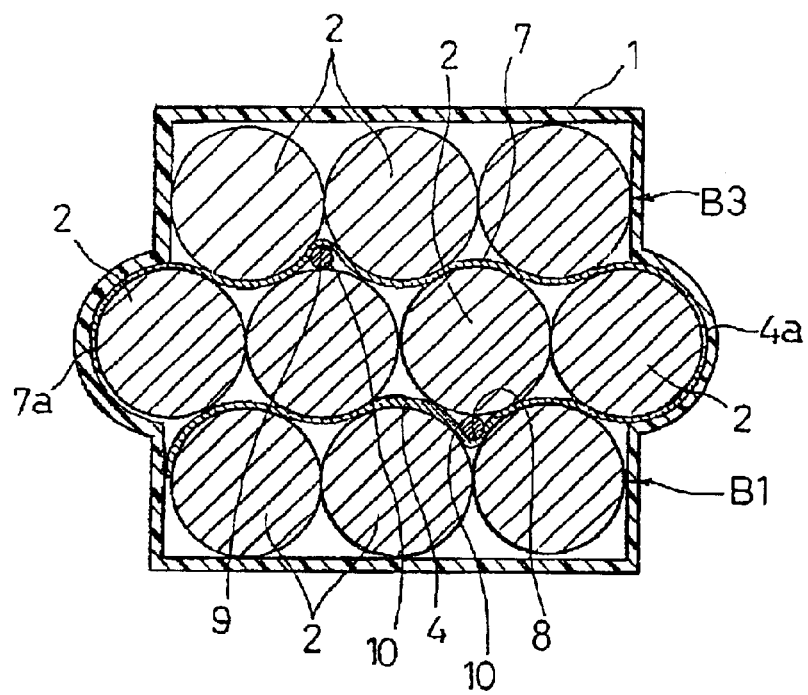
FIG. 2 is a cross-sectional view of the battery pack sectioned along a direction perpendicular to the axial center of the cell.
Figure 3:
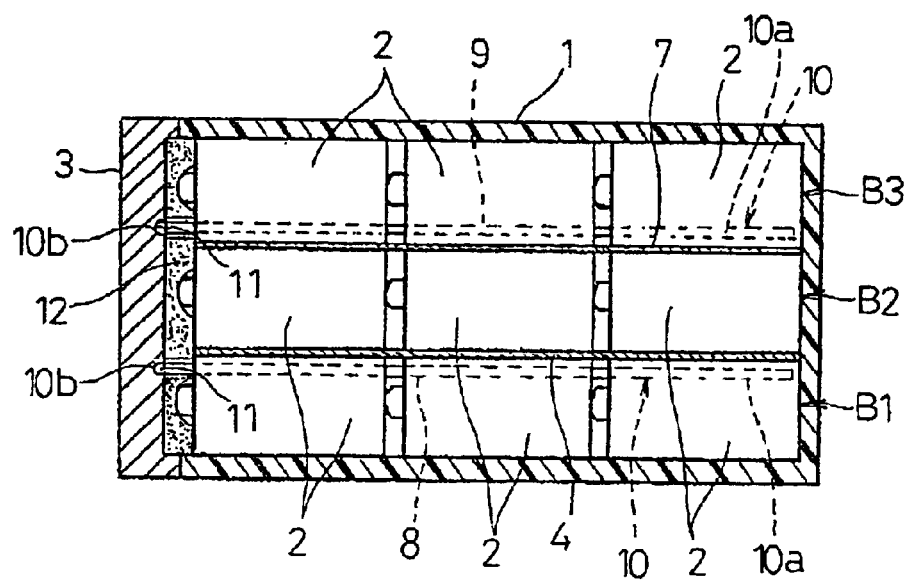
FIG. 3 is a cross-sectional view of the battery pack sectioned along a direction of the axial center of the cell.

FIG. 2 is a cross-sectional view of the assembled battery pack sectioned along a direction perpendicular to the axial center of the cell 2, and FIG. 3 is a cross-sectional view of the battery pack sectioned along a direction of the axial center of the cell 2. In FIG. 2, the heat collecting plate (4, 7) has a wave-like section, i.e. a section consisting of concavely-curved portions alternating with convexly-curved portions, so as to fit to the outer peripheral surfaces of the cells 2. The heat collecting plate is so arranged as to make contact with the outer surface of each of the upper and lower tiers of the cylindrical cells 2 alternately. This arrangement allows any of the cells 2 to be contacted by the heat collecting plate on at least a region, which extends circumferentially approximately 60 degrees, of its outer peripheral surface. Therefore, in spite of the fact that as many as 30 pieces of cells 2 are stacked in a staggered arrangement, it is possible to secure as large a contact area as possible between the cells 2 and the heat collecting plate (4, 7). This enables the heat collecting plate to collect heat generated by the cells 2 thoroughly and substantially evenly. Further, the heat collecting plate (4, 7) is formed from a sheet material exhibiting excellent thermal conductivity, such as aluminum or copper, and thus collects heat generated by the cells 2 efficiently.

The heat collecting plate (4, 7) has at its one end a fixed heat dissipating portion (4a, 7a) extendedly formed so as to cover the cells 2. The fixed heat dissipating portion (4a, 7a) is sandwiched between the outermost cell 2 and the inner surface of the pack case 1. In this way, the heat collecting plate (4, 7) is securely maintained contact with the outer peripheral surfaces of the cells 2, and part of the heat collected by the heat collecting plate (4, 7) is, though slightly, dissipated, through the resin-made pack case 1 exhibiting poor thermal conductivity, to the outside. The fixed heat dissipating portion (4a, 7a) may be provided at both ends of the heat collecting plate (4, 7).

Moreover, since the heat collecting plate (4, 7), interposed between the battery modules B1 to B3, is shaped like a thin sheet, its use causes no significant increase in the height of the entire 30 pieces of staggeredly-stacked cells 2. Accordingly, the capacity of the pack case 1 is never increased and thus the battery pack as a whole is made compact.

Heat collected by the heat collecting plate (4, 7) is transferred, as latent heat, from the heating portion 10a of the heat pipe 10, which is engaged into the fitting groove (8, 9) of the heat collecting plate (4, 7), to the heat dissipating portion 10b. The heat pipe 10 has a heat transfer amount per weight an order of magnitude greater than that of a typical solid heat conducting material, and is thus allowed to transfer heat collected by the heat collecting plate (4, 7) toward the heat dissipating member 3 at an extremely high speed. As shown in FIG. 2, the heat pipe 10 is placed within a triangular cross-section gap secured between three adjacent cells 2 while being retained in the fitting groove (8, 9) of the heat collecting plate (4, 7). Therefore, the placement of the heat pipe 10 causes no increase in the height of the entire 30 pieces of staggeredly-stacked cells 2, and the capacity of the pack case is never increased.

Moreover, the metal heat dissipating member 3, formed from a metal material exhibiting excellent thermal conductivity, such as aluminum or copper, is so configured as to serve also as a lid plate of the pack case 1 and function as a heat sink. As shown in FIG. 3, the heat dissipating member 3 has, on its inner-surface, side two concavely-formed receiving grooves 11 for retaining the heat dissipating portions 10b which is formed in the heat pipes 10 so as to extend perpendicular to the heating portions 10a. Between the inner surface of the heat dissipating member 3 and the cells 2 housed in the pack case 1 is interposed an elastic insulating member 12. The flat-shaped elastic insulative member 12 is formed from a material having excellent thermal conductivity and high electric insulation property, for example, silicon-based elastic body such as silicon synthetic rubber.

Figure 4:
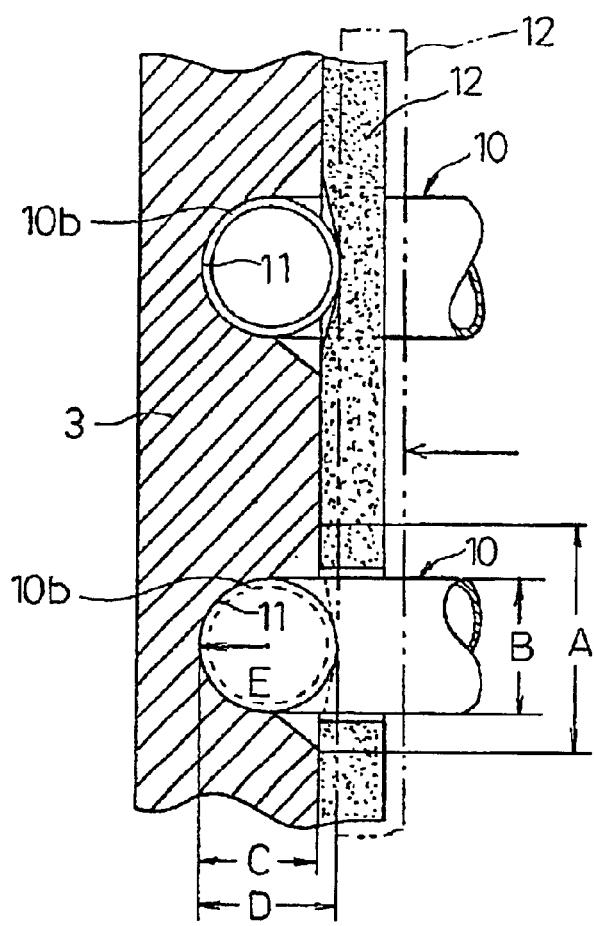
FIG. 4 is an enlarged detail cross-sectional view of the battery pack, illustrating the relationship among the heat dissipating member, the heat pipe, and the elastic insulative member.

FIG. 4 is an enlarged cross-sectional view illustrating the relationship among the above-described heat dissipating member 3, the heat pipe 10, and the elastic insulative member 12 in detail. One half of the receiving groove 11 on the groove-bottom side has a semi-circular section whose radius E is identical with a radius E of the outer periphery of the heat dissipating portion 10b of the heat pipe 10. Thus, the heat pipe 10 is, at one half of the outer periphery of its heat dissipating portion 10b, tightly fitted into the receiving groove 11 of the heat dissipating member 3. This allows latent heat, which is fed from the heating portion 10a at a high speed, to be efficiently transferred to the heat dissipating member 3.

Moreover, the receiving groove 11 has a groove depth C slightly smaller than an outer diameter D of the heat dissipating member 10b of the heat pipe 10. In this structure, as shown by a chain double-dashed line in the figure, the elastic insulative member 12 makes substantially line contact with the outer surface of the heat dissipating portion 10b of the heat pipe 10 at a slight distance from the inner surface of the heat dissipating member 3, and thereafter, when the opening of the pack case 1 is completely covered with the heat dissipating member 3 serving also as a lid plate, the elastic insulative member 12 is deflected against the pressing force exerted by the cells 2 housed in the pack case 1 to push the heat dissipating portion 10b of the heat pipe 10 into the receiving groove 11. Thus, one half of the outer periphery of the heat dissipating portion 10b of the heat pipe 10 is forcibly pressed to be smoothly and tightly fitted into one half of the receiving groove 11 on the groove-bottom side, which has a semi-circular section whose radius E is identical with the radius E of the outer periphery of the heat dissipating portion, and is then constantly maintained intimate contact therewith.

As is apparent from FIG. 1, the heat dissipating portion 10b of the heat pipe 10 is bent perpendicularly to the heating portion 10a and extends to a predetermined length so as to increase the contact area between the heat pipe 10 and the heat dissipating member 3. When the pack case 1 is closed with the heat dissipating member 3, the heat dissipating portion 10b of a predetermined length needs to be smoothly brought into intimate contact with the receiving groove 11 of the heat dissipating member 3. Thus, other half of the receiving groove 11 on the opening side has an opening diameter A far larger than an outer diameter B of the heat pipe 10. This allows, when the opening of the pack case 1 is covered with the heat dissipating member 3, the heat dissipating portion 10b of the heat pipe 10 to be smoothly guided along the tapered surface of the receiving groove 11 and thereby fitted into the groove-bottom portion.

As described heretofore, in the battery pack of the embodiment, heat generated by 30 pieces of cells 2 housed in the pack case 1 in a staggeredly-stacked arrangement is substantially evenly and efficiently collected by the heat collecting plate (4, 7), and the heat collected is swiftly guided by the heat pipe 10 to the metal heat dissipating member 3 as latent heat. Moreover, since one half of the outer periphery of the heat pipe 10's heat dissipating portion 10b of a predetermined length is tightly fitted into the receiving groove 11 of the heat dissipating member 3, the heat fed from the heating portion 10a is efficiently transferred from the heat dissipating portion 10b to the heat dissipating member 3, and is then dissipated therefrom to the outside. The heat dissipating effect in charging is further enhanced by sending air to the heat dissipating member 3 using a fan incorporated into the charger. Consequently, in this battery pack, heat generated by the cells 2 is efficiently dissipated to the outside, thereby allowing continuous charging and discharging. Moreover, since heat generated by the cells 2 is collected evenly, there is little difference in temperature among the cells 2. Thus, the battery functions of the cells 2 are made uniform, so that the battery pack as a whole is constantly maintained in a high-performance state.

Although not illustrated in the figures, in the embodiment, heat-conductive grease is applied to the entire inner surface of the fitting groove (8, 9) of the heat collecting plate (4, 7), into which the heat dissipating portion 10b of the heat pipe 10 is fitted. This further improves heat conduction between the heat collecting plate (4, 7) and the heating portion 10a of the heat pipe 10. Although the heat pipe 10 has its heat dissipating portion 10b fitted into the fitting groove (8, 9), as additional fixing means, it may be soldered to the heat collecting plate (4, 7). In this case, the heat collecting plate (4, 7) and the heat pipe 10 are handled as a single unit. This significantly facilitates the assembly of the battery pack, and also provides satisfactory heat conduction between the heat pipe 10 and the heat collecting plate (4, 7). Note that, although no illustration is given as to electric connection among 30 pieces of cells, this embodiment deals with a battery pack for use as a driving power source in an electric tool. For example, as a cell 2, a nickel metal hydride battery is used that offers an output voltage of 1.2V, and 30 pieces of the cells 2 are connected in series with one another so as to obtain an output voltage of 36V. In this battery pack, connection of the cells 2 is made by a nickel plate, and a terminal holder is provided on the outer side of the pack case 1.

The results of experiments performed on trial products of the battery pack are shown in Table 1 below.

|  | Heat | Cell Temperature in Battery Pack | | |
| --- | --- | --- | --- | --- |
|  | Heat Pipe | Heat Collecting Plate | Maximum | Minimum | Temperature Difference |
| Battery Pack 1 | Absent | Absent | 49.8 | 40.8 | 9.0 |
| Battery Pack 2 | Present | Absent | 45.7 | 39.7 | 6.0 |
| Battery Pack 3 | Present | Present | 43.0 | 39.0 | 4.0 |

Battery packs 1 to 3 are fabricated as follows. 3 pieces of cylindrical nickel hydride batteries are connected in series with one another in an axial direction to form a single battery tier. 10 pieces of the battery tiers are stacked in a staggered arrangement to form a battery cell. The battery cell is housed in a pack case. The battery pack 3, constructed substantially in the same manner as in the first embodiment, is provided with a heat collecting plate and a heat pipe. The heat collecting plate, made of an extremely thin, 0.3 mm-thick aluminum sheet, is sandwiched between three tiers of the battery modules B1 to B3 shown in FIG. 2. The 3 mm-diameter heat pipe is bent in a shape of a letter "L", and has a heating portion and a heat dissipating portion, and heat dissipating portion being arranged perpendicularly to the heating portion. The heat pipe is, at its heating portion, retained in a fitting groove formed in the heat collecting plate. The battery pack 2, constructed substantially in the same manner as in the first embodiment, has two heat pipes but has no heat collecting plate. The heat pipes make direct contact with the cells. The battery pack 1, constructed substantially in the same manner as in the first embodiment, has neither heat pipe nor heat collecting plate.

In the battery pack 1 having neither heat pipe nor heat collecting plate, the maximum temperature of the cell reached 49.8° C., and the difference in temperature among the cells reached 9° C. In the battery pack 2 having only the heat pipe, as compared with the battery pack 1, the maximum temperature of the cell and the difference in temperature among the cells were slightly reduced and found to be 45.7° C. and 6° C., respectively. By contrast, in the battery pack 3 constructed substantially in the same manner as in the first embodiment, the maximum temperature of the cell and the difference in temperature among the cells were significantly reduced and found to be 43.0° C. and 4° C., respectively. This is because, in the battery pack 3, internal heat is efficiently dissipated to the outside, and heat generated by the cells is collected substantially evenly. Therefore, using the battery pack 3 makes it possible to perform charging and discharging continuously, to prolong the service life of the cells, and to make uniform the battery functions of the cells, so that the battery pack as a whole is brought into a high-performance state.

Figure 5:
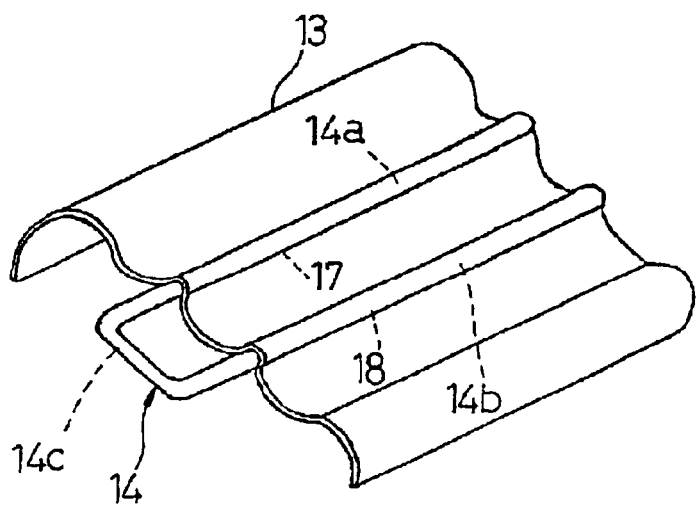
FIG. 5 is a perspective view showing the heat collecting plate and heat pipe employed in battery pack according to a second embodiment of the present invention.

FIG. 5 is a perspective view of a second embodiment of the battery pack according to the present invention, illustrating a heat collecting plate 13 and a heat pipe 14 employed therein. The battery pack of the second embodiment has substantially the same structure as the first embodiment but has the following structure. The heat pipe 14 consists of two parallely-arranged heating portions 14a and 14b and a single heat dissipating portion 14c that are integrally formed with one another. The single heat dissipating portion 14c acts as the connection between one ends of the heating portions 14a and 14b. The heat collecting plate 13 has in its two adjacent concavely-curved surfaces fitting grooves 17 and 18 to receive the heating portions 14a and 14b.

In this battery pack, the heat pipe 14 is, at its two heating portions 14a and 14b, contactingly attached to a single heat collecting plate 13. This arrangement allows heat collected in the heat collecting plate 13 to be transferred to the heat pipe 14 more efficiently, and the heat absorbed by the heat pipe 14 to be moved toward the heat dissipating member 3 more swiftly. Thus, the cells 2 and the inner portion of the pack case 1 are effectively cooled down.

Figure 6:
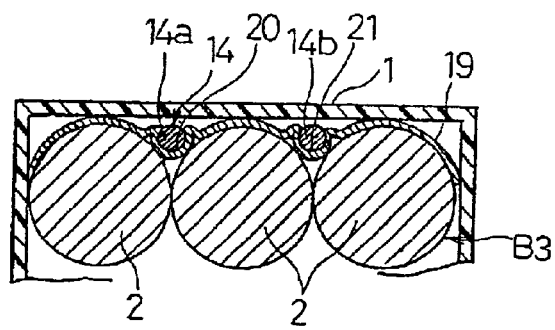
FIG. 6 is a partial cross-sectional view of a battery pack according to a third embodiment of the present invention.

FIG. 6 is a partial section of a third embodiment of the battery pack according to the present invention. In the figure, the components that play the same or corresponding roles as in the embodiment shown in FIG. 2 are identified with the same reference symbols, and overlapping descriptions will be omitted. The battery pack of this embodiment has one additional heat collecting plate 19 compared with the first embodiment. The heat collecting plate 19 is so arranged as to cover pack case 1-side outer surfaces of cells 2 constituting an upper battery module B3. In this embodiments, the heat pipe 14 used in the second embodiment is employed. Two heating portions 14a and 14b of the heat pipe 14 are received in fitting grooves 20 and 21, respectively, of the heat collecting plate 19. The fitting grooves 20 and 21 are formed by bending a surface of the heat collecting plate 19 opposite to the cell 2 side surface thereof.

In general, heat generated by the cell 2 is transferred from the central portion of the battery pack to the outer side thereof. Thus, heat generated by each of the cells 2 tends to be trapped in a gap between the cell 2 and the pack case 1 while being intensified. To prevent this, in this embodiment, heat generated by each of the cells 2 is collected by the heat collecting plate 19, which is contactingly arranged along the upper surfaces of the cells 2, is then guided by the heat pipe 14 toward the heat dissipating member 3, and is thereby dissipated to the outside. Moreover, the heating portions 14a, 14b of the heat pipe 14 are held in the fitting grooves 20 and 21 which are formed in one surface of the heat collecting plate 19 opposite to the cell 2-side surface thereof. This means that the heating portion (14a, 14b) does not lie between the heat collecting plate 19 and the cells 2. Accordingly, the contact area between the heat collecting plate 19 and the cells 2 is increased, and thus heat generated by the cells 2 is colleted more efficiently.

Figures 7A, 7B:
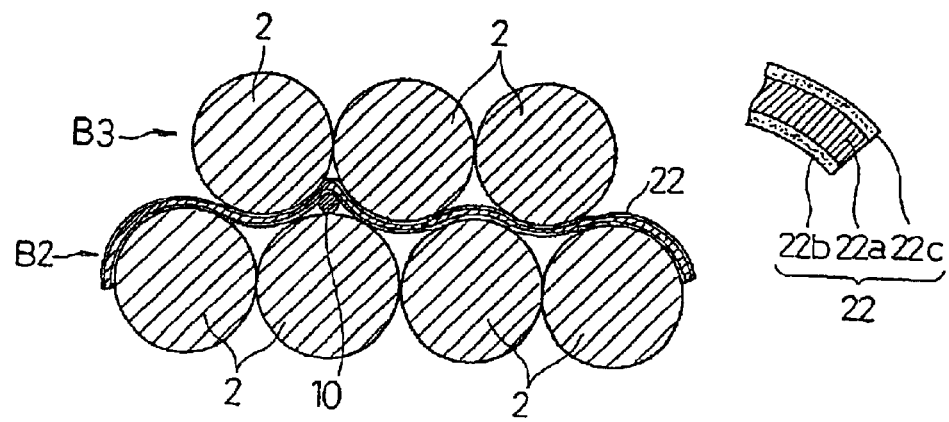
FIG. 7A is a partial cross-sectional view of a battery pack according to a fourth embodiment of the present invention.
FIG. 7B is an enlarged partial cross-sectional view of the heat collecting plate.

FIG. 7A is a partial cross-section of a battery pack according to a fourth embodiment of the present invention, and FIG. 7B is an enlarged partial cross-section of a heat collecting plate 22 employed in the fourth embodiment. In these figures, the components that play the same or corresponding roles as in the embodiment shown in FIG. 2 are identified with the same reference symbols, and overlapping descriptions will be omitted. The battery pack of this embodiment has substantially the same structure as the first embodiment except that the former employs, instead of the heat collecting plate (4, 7) of the first embodiment, a heat collecting plate 22 formed from an aluminum laminate sheet. The heat collecting plate 22 consists of a heat collecting plate portion 22a made of an aluminum sheet having adhesive layers 22b and 22c on both sides.

In this battery pack, the heating portion 10a of the heat pipe 10 is adhesively fixed to the adhesive layer 22b of the heat collecting plate 22. This eliminates the need to form a fitting groove (8, 9), as provided in the first embodiment, in the heat collecting plate 22. Moreover, in assembly, the heat collecting plate 22 and the heat pipe 10 are handled as a single unit. Further, the heating plate 22 is, at its adhesive layers 22b and 22c, bonded to a predetermined area of the outer surface of the cell 2. Consequently, the cells 2 are inserted into the pack case 1 in a state of being stacked in a staggered arrangement with the heat collecting plate 22 inserted therebetween, so that the assembly workability significantly improves. Furthermore, in the assembled battery pack, the heating plate 22 is, at its adhesive layers 22b and 22c, adhesively and tightly fixed to the outer surface of the cell 2. This makes it possible to ensure highly-efficient heat conduction between the cells 2 and the heat collecting plate 22 for a longer period of time.

Figure 8:
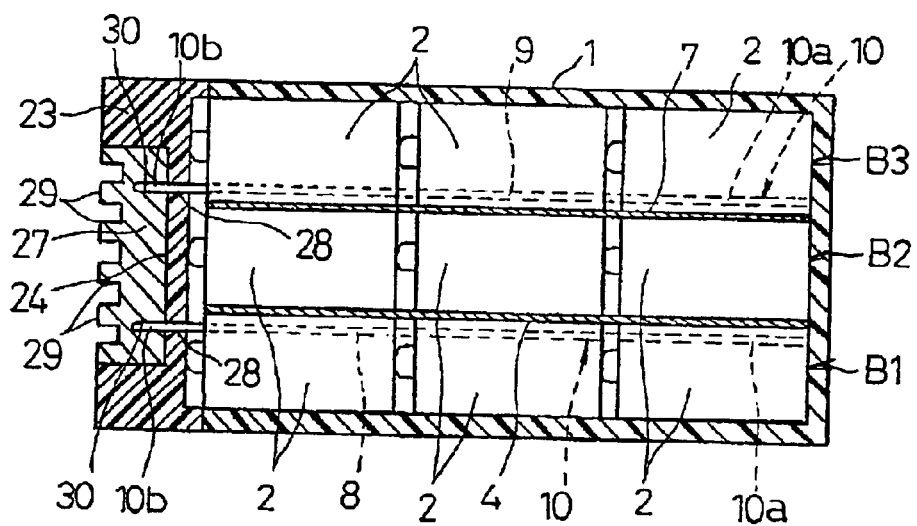
FIG. 8 is a cross-sectional view of a battery pack according to a fifth embodiment of the present invention, sectioned along a direction of the axial center of the cell.

FIG. 8 is a cross-sectional view of a battery pack according to a fifth embodiment of the present invention, illustrating the battery pack sectioned along a direction of the axial center of the cell 2. In the figure, the components that play the same or corresponding roles as in the embodiment shown in FIG. 3 are identified with the same reference symbols, and overlapping descriptions will be omitted. The battery pack of this embodiment has substantially the same structure as that of the first embodiment, and the only difference is that, in the former, instead of the metal-made heat dissipating member 3 functioning as a heat sink of the first embodiment, a lid plate 23 made of synthetic resin and a heat dissipating member 27 are provided, and the elastic insulative member 12 of the first embodiment is omitted. The heat dissipating member 27 is fitted into and fixed to a fitting recess 24 provided on the outer-surface side of the lid plate 23. The lid plate 23 has through holes 28 for insertion of the heat pipes 10. The heat dissipating member 27 is made of metal exhibiting excellent thermal conductivity, such as aluminum or copper, and functions as a heat sink. Further, the heat dissipating member 27 has a multiplicity of fins 29 formed on its outer-surface side to increase its surface area. This significantly improves the heat dissipation property.

In this battery pack, the opening of the resin pack case 1 is closed with the resin lid plate 23. This eliminates the need to use the elastic insulative member 12 for providing electrical insulation between the cell 2 and the lid plate 23. Hence, the number of constituent components is reduced, thereby achieving cost reduction. Moreover, the heat dissipating portion 10b of the heat pipe 10, inserted through the through hole 28 of the lid plate 23, is fitted into and bonded to an engagement hole 30 of the metal heat dissipating member 27. Hence, this battery pack is, despite having no elastic insulative member 12 of the first embodiment, capable of keeping the heat dissipating portion 10b of the heat pipe 10 and the heat dissipating member 27 in a state where heat is constantly transferred therebetween with reliability.

INDUSTRIAL APPLICABILITY

As described heretofore, in the battery pack according to the present invention, heat generated by a multiplicity of cells accommodated in a pack case is substantially evenly and efficiently collected by a heat collecting plate, and the heat collected is swiftly guided by a heat pipe, which is fitted into a fitting groove of the heat collecting plate, to a heat dissipating member as latent heat, and is thereby dissipated to the outside. In this battery pack, heat generated by the cells is efficiently dissipated to the outside. This makes possible continuous charging and discharging. Moreover, since heat generated by the cells accommodated inside the battery pack is collected evenly, there is little difference in temperature among the cells. Thus, the battery functions of the cells are made uniform, so that the battery pack as a whole is constantly maintained in a high-performance state.

What is claimed is:

1. A battery pack comprising:

a plurality of cells stacked on top of one another in tiers;

a heat collecting plate made of a wave-like metal sheet, the heat collecting plate being interposed between tiers of the cells so as to make contact with part of an outer peripheral surface of each of upper and lower tiers of the cells alternately;

a heat pipe having a heating portion fitted into a fitting groove formed in said heat collecting plate;

a pack case for accommodating the cells, the heat collecting plate, and the heat pipe; and a heat dissipating member attached to said pack case so as to close an opening of the pack case, the heat dissipating member having on its inner-surface side a concavely-formed receiving groove into which a heat dissipating portion of said heat pipe is fitted.

2. The battery pack according to claim 1, wherein the wave-like heat collecting plate has in its concavely-curved surface a fitting groove and the heat pipe is arranged in a gap between the adjacent cells while being held in said fitting groove.

3. The battery pack according to claim 1, wherein the heat collecting plate has, at least at its one end, a fixed heat dissipating portion which is extendedly formed so as to cover outermost cells, and said fixed heat dissipating portion is sandwiched between the outermost cells and an inner surface of the pack case.

4. The battery pack according to claim 1, further comprising a heat collecting plate arranged between an uppermost or lowermost tier of the cells and the inner surface of the pack case, the heat collecting plate being formed in a wave-like shape so as to make contact with the outer peripheral surfaces of said cells one by one.

5. The battery pack according to claim 1, wherein the fitting groove is formed on one surface of the heat collecting plate opposite to other surface thereof that makes contact with the cell.

6. The battery pack according to claim 1, wherein the heat pipe is soldered to said heat collecting plate, with a heating portion fitted into the fitting groove of the heat collecting plate.

7. The battery pack according to claim 1, wherein a heat collecting plate is formed from a laminate sheet, the heat collecting plate including a heat collecting plate portion having adhesive layers on both surfaces, and said heat collecting plate has no fitting groove but has said adhesive layer bonded to the heat pipe.

8. The battery pack according to claim 1, wherein the heat pipe has a heating portion and a heat dissipating portion, the heat dissipating portion being arranged perpendicular to the heating portion, and thus has a shape of a letter "L".

9. The battery pack according to claim 1, wherein a heat pipe has two parallelly-arranged heating portions, the heating portions being, at their one ends, coupled in communication to each other via a heat dissipating portion, and a heat collecting plate has parallely-arranged fitting grooves to receive said two heating portions.

10. The battery pack according to claim 1, wherein heat-conductive grease is provided between the fitting groove of the heat collecting plate and the heating portion of the heat pipe.

11. The battery pack according to claim 1, wherein heat-conductive grease is provided between the receiving groove of the heat dissipating member and the heat dissipating portion of the heat pipe.

12. The battery pack according to claim 1, further comprising an elastic insulative member having thermal conductivity and electric insulation property is interposed between an inner-surface of the heat dissipating member and the cells housed in an opening end portion of the pack case, and said elastic insulative member is pressed by said cell to push the heat dissipating portion of the heat pipe into the receiving groove.

13. The battery pack according to claim 1, wherein the receiving groove of the heat dissipating member has a groove depth smaller than an outer diameter of the heat dissipating portion of the heat pipe, one half of the receiving groove on a groove-bottom side has an arc-shaped section whose radius is identical with a radius of said heat dissipating portion, and a width of a groove opening is made larger than an outer diameter of said heat dissipating portion.

14. A battery pack comprising:

a plurality of cells stacked on top of one another in tiers;

a heat collecting plate made of a wave-like metal sheet, the heat collecting plate being interposed between tiers of the cells so as to make contact with part of an outer peripheral surface of each of upper and lower tiers of the cells alternately;

a heat pipe having a heating portion fitted into a fitting groove formed in said heat collecting plate;

a resin-made pack case for receiving the cells, the heat collecting plate, and the heat pipe at its opening;

a resin-made lid plate for closing the opening of said pack case; and a heat dissipating member fitted into a fitting recess formed on an outer-surface side of said lid plate, the heat dissipating member having on its inner-surface side an engagement portion into which a heat dissipating portion of the heat pipe, which is inserted through said lid plate, is fitted.

* * * * *